US006333113B2

(12) United States Patent
Sugie et al.

(10) Patent No.: US 6,333,113 B2
(45) Date of Patent: *Dec. 25, 2001

(54) THERMOPLASTIC RESIN COMPOSITION AND SHEETS AND CARDS MADE FROM THE SAME

(75) Inventors: Ryuichi Sugie; Toru Nishimura, both of Nagoya; Motoki Hiratsuka, Chita-gun, all of (JP)

(73) Assignee: Toray Industries, Inc. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/051,063

(22) PCT Filed: Aug. 1, 1997

(86) PCT No.: PCT/JP97/02698

§ 371 Date: Apr. 13, 1998

§ 102(e) Date: Apr. 13, 1998

(87) PCT Pub. No.: WO98/05705

PCT Pub. Date: Feb. 12, 1998

(30) Foreign Application Priority Data

Aug. 5, 1996 (JP) .................................................... 8-206274
Aug. 5, 1996 (JP) .................................................... 8/206275
Apr. 18, 1997 (JP) .................................................... 9/101805

(51) Int. Cl.$^7$ ............................... B32B 27/36; G11B 3/70
(52) U.S. Cl. ........................ 428/412; 428/65.3; 428/143; 428/156; 428/324; 428/363; 428/480; 428/900; 428/64.7; 525/437; 525/439; 360/131; 369/272; 369/288
(58) Field of Search ..................................... 525/437, 439; 428/900, 913, 143, 920; 264/106, 328.1; 156/209, 242, 297; 346/135.1; 360/131, 97; 365/126; 369/13, 272, 275.2, 288

(56) References Cited

U.S. PATENT DOCUMENTS 4,188,314 * 2/1980 Fox et al. .......................... 260/37 PC
4,414,316 * 11/1983 Conley .................................. 430/496
5,207,967 * 5/1993 Small, Jr. et al. .............. 264/328.16
5,731,389 * 3/1998 Bailly et al. ........................ 525/437

FOREIGN PATENT DOCUMENTS 0 111 810 A  *  6/1984  (EP) .
59120648     12/1984  (JP) .
62270653 A   11/1987  (JP) .
06228425A  *  8/1994  (JP) .
7509009       5/1995  (JP) .

* cited by examiner

*Primary Examiner*—Donald J. Loney
(74) *Attorney, Agent, or Firm*—Schnader Harrison Segal & Lewis LLP

(57) ABSTRACT

Cards which contain any one of the following thermoplastic resin compositions I to III in its material can be used as magnetic cards, IC cards, etc. since they are excellent in heat resistance, processability and embossability: a composition consisting of ingredients (A) and (B); a composition consisting of ingredients (A), (B) and (D); and a composition consisting of 100 parts by weight of one or more selected from the following ingredients (A), (B) and (D) and 2 to 25 parts by weight of the following ingredient (C), wherein ingredient (A) is a polyester composed of dicarboxylic acid components with terephthalic acid component as a main dicarboxylic acid component and ethylene glycol component (I) and 1,4-cyclohexanedimethanol component (II) as main glycol components, wherein the molar ratio (I)/(II) of ethylene glycol component (I) to 1,4-cyclohexanedimethanol component (II) is 1 or more; ingredient (B) is an aromatic polycarbonate; ingredient (C) is an inorganic sheet-like filler of 0.5 to 20 $\mu$m in average grain size; and ingredient (D) is a polyester composed of dicarboxylic acid components with terephthalic acid component as a main dicarboxylic acid component and ethylene glycol component (I) and 1,4-cyclohexanedimethanol component (II) as main glycol components, wherein the molar ratio (I)/(II) of ethylene glycol component (I) to 1,4-cyclohexanedimethanol component (II) is less than 1.

16 Claims, No Drawings

THERMOPLASTIC RESIN COMPOSITION AND SHEETS AND CARDS MADE FROM THE SAME

BACKGROUND ART

The present invention relates to cards such as magnetic cards and IC cards excellent in the balance among heat resistance, processability and embossability, a sheet suitable for such cards, and a thermoplastic resin composition for such cards and sheet.

In recent years, cards such as magnetic cards and IC cards are used for various applications. These cards are often embossed to three-dimensionally highlight symbols and characters. These cards are generally formed by a multi-layer sheet made of hard polyvinyl chloride resin. However, since polyvinyl chloride resin is poor in durability and heat resistance, it may be deformed when exposed to a high temperature, and an embossable card material excellent in heat resistance to substitute polyvinyl chloride resin has been being demanded.

Since 1,4-cyclohexanedimethanol derivative copolymerized polyesters are well embossable resins and are also excellent in mechanical strength and chemicals resistance, their application to cards is being examined. The 1,4-cyclohexanedimethanol derivative copolymerized polyesters are about 80° C. in glass transition temperature and are characteristically excellent also in processability, since they can be thermally fused at low temperatures of about 110 to 120° C. when processed into multi-layer sheets. However, because of the low glass transition temperature, they cannot be used for applications requiring heat resistance. One of methods conventionally considered for improving the heat resistance of 1,4-cyclohexanedimethanol derivative copolymerized polyesters is to blend a polymer with a high glass transition temperature.

Japanese Patent Laid-Open (Kokai) No. 53-94536 discloses a blend of a polycarbonate and poly(1,4-cyclohexanedimethanol terephthalate-co-isophthalate) and a sheet made of it. The blend remains compatible in a wide range of mixing ratios, and has the transparency peculiar to the polycarbonate and poly(1,4-cyclohexanedimethanol terephthalate-co-isophthalate). The blend consisting of a polycarbonate and poly(1,4-cyclohexanedimethanol terephthalate-co-isophthalate) and a sheet made of it can be certainly improved in heat resistance by increasing the polycarbonate content. However, if heat resistance is improved, the processing temperature also rises, and the blend and sheet could not have both high heat resistance and high processability.

Japanese Patent Laid-Open (Kokai) No. 59-120648 discloses a blend consisting of a polycarbonate and a 1,4-cyclohexanedimethanol derivative copolymerized polyester. The blend can be substantially transparent (when 1,4-cyclohexanedimethanol content is larger), or translucent or opaque (when ethylene glycol content is larger), depending on which of 1,4-cyclohexanedimethanol or ethylene glycol is contained more in the glycol component of the 1,4-cyclohexanedimethanol derivative copolymerized polyester used. However, a substantially transparent blend is difficult to have both high heat resistance and high processability, since the processing temperature rises if the heat resistance is improved. Furthermore, said Japanese Patent Laid-Open (Kokai) 59-120648 does not state anything about the thermal fusibility of the sheet, and does not disclose anything about the applicability to a multi-layer sheet or cards.

Moreover, a blend consisting of a polycarbonate and a 1,4-cyclohexanedimethanol derivative copolymerized polyester has a problem that it is not suitable for embossable cards since if the polycarbonate content is increased, the embossability greatly declines though the heat resistance can be improved.

A polycarbonate alone is excellent in heat resistance, but is poor in embossability, and has been little examined for application to cards.

Japanese Patent Laid-Open (Kokai) No. 8-279150 discloses a card using non-oriented heat-crystallized polyethylene terephthalate. However, this card has a problem of low embossability though having excellent heat resistance.

The problem of the present invention is to provide cards such as magnetic cards and IC cards excellent in the balance among heat resistance, processability and embossability, a sheet suitable for such cards, and a thermoplastic resin composition suitable for such cards and sheet.

DISCLOSURE OF THE INVENTION

The inventors studied intensively to provide cards such as magnetic cards and IC cards excellent in the balance among heat resistance, processability and embossability, a sheet suitable for such cards, and a thermoplastic resin composition suitable for such cards and sheet, and as a result, found that a blend consisting of a polycarbonate and a polyester composed of dicarboxylic acid components with terephthalic acid component as a main dicarboxylic acid component and ethylene glycol component (I) and 1,4-cyclohexanedimethanol component (II) as main glycol components, with the molar ratio (I)/(II) of ethylene glycol component (I) to 1,4-cyclohexanedimethanol component (II) kept at 1 or more is high in the effect of improving heat resistance at a relatively low load required for card application, and furthermore that if a polyester composed of dicarboxylic acid components with terephthalic acid component as a main dicarboxylic acid component, and ethylene glycol component (I) and 1,4-cyclohexanedimethanol component (II) as main glycol components, with the molar ratio (I)/(II) of ethylene glycol component (I) to 1,4-cyclohexanedimethanol component (II) kept smaller than 1 is further contained, the processability and heat resistance can be further improved. Moreover, it was found that an inorganic sheet-like filler with a specific average grain size is highly effective for improving the embossability. Thus, the present invention has been completed.

The present invention is:
(1) A card, comprising any one of the following thermoplastic resin compositions I to III in its material:
  I. A composition consisting of the following ingredients (A) and (B)
  II. A composition consisting of the following ingredients (A), (B) and (D)
  III. A composition consisting of 100 parts by weight, in total, of the following ingredients (A), (B) and (D) and 2 to 25 parts by weight of the following ingredient (C)
(In the above I to III,
  the ingredient A is a polyester composed of dicarboxylic acid components with terephthalic acid component as a main dicarboxylic acid component and ethylene glycol component (I) and 1,4-cyclohexanedimethanol component (II) as main glycol components, with the molar ratio (I)/(II) of ethylene glycol component (I) to 1,4-cyclohexanedimethanol component (II) kept at 1 or more;
  the ingredient B is an aromatic polycarbonate;
  the ingredient C is an inorganic sheet-like filler of 0.5 to 20 μm in average grain size; and the ingredient (D) is a polyester composed of dicarboxylic acid components with terephthalic acid component as a main dicarboxylic acid component and ethylene glycol component (I) and 1,4-cyclohexanedimethanol component (II) as main glycol components, with the molar ratio (I)/(II) of ethylene glycol component (I) and 1,4-cyclohexanedimethanol component (II) kept at smaller than 1.)

(2) A card, stated in the above (1), which can electrically, optically or magnetically record readable and writable information and/or can record information by embossing.

(3) A card, stated in the above (1) or (2), wherein the thermoplastic resin composition is the composition II with a dispersed structure in which a phase mainly consisting of the ingredients (A) and (D) exists as a continuous phase.

(4) A card, stated in the above (1) or (2), wherein the thermoplastic resin composition is the composition II with a dispersed structure in which a phase mainly consisting of the ingredients (D) and (B) exists as a continuous phase.

(5) A card, stated in any one of the above (1) through (4), wherein the thermoplastic resin is the composition III.

(6) A card, stated in any one of the above (1) through (5), wherein the thermoplastic resin composition is a composition consisting of the ingredients (A), (B), (C) and (D) with a dispersed structure in which a phase mainly consisting of the ingredients (A) and (D) exists as a continuous phase.

(7) A card, stated in any one of the above (1) through (5), wherein the thermoplastic resin composition is a composition consisting of the ingredients (A), (B), (C) and (D) with a dispersed structure in which a phase mainly consisting of the ingredients (D) and (B) exists as a continuous phase.

(8) A card, stated in any one of the above (1) through (7), which is embossed.

(9) A card, stated in any one of the above (1) through (8), wherein the sheet-like filler is talc.

(10) A card, stated in any one of the above (1) through (9), which is obtained by processing a sheet.

(11) A card, stated in any one of the above (1) through (10), which is obtained by processing a multi-layer sheet produced by laminating a plurality of sheets.

The present invention is also:

(12) A sheet, comprising a thermoplastic resin composition consisting of the following ingredients (A), (D) and (B):

Ingredient (A): A polyester composed of dicarboxylic acid components with terephthalic acid component as a main dicarboxylic acid component and ethylene glycol component (I) and 1,4-cyclohexanedimethanol component (II) as main glycol components, with the molar ratio (I)/(II) of ethylene glycol component (I) to 1,4-cyclohexanedimethanol component (II) kept at 1 or more Ingredient (B): An aromatic polycarbonate Ingredient (D): A polyester composed of dicarboxylic acid components with terephthalic acid component as a main dicarboxylic acid component and ethylene glycol component (I) and 1,4-cyclohexanedimethanol component (II) as main glycol components, with the molar ratio (I)/(II) of ethylene glycol component (I) and 1,4-cyclohexanedimethanol component (II) kept at smaller than 1.

(13) A sheet, stated in the above (12), wherein the thermoplastic resin composition has a dispersed structure in which a phase mainly consisting of the ingredients (A) and (D) exists as a continuous phase.

(14) A sheet, stated in the above (12), wherein the thermoplastic resin composition has a dispersed structure in which a phase mainly consisting of the ingredients (D) and (B) exists as a continuous phase.

(15) A sheet, comprising a thermoplastic resin composition consisting of 100 parts by weight of one or more thermoplastic resins selected from the following ingredients (A), (B) and (D) and 2 to 25 parts by weight of the following ingredient (C):

Ingredient (A): A polyester composed of dicarboxylic acid components with terephthalic acid component as a main dicarboxylic acid component and ethylene glycol component (I) and 1,4-cyclohexanedimethanol component (II) as main glycol components, with the molar ratio (I)/(II) of ethylene glycol component (I) to 1,4-cyclohexanedimethanol component (II) kept at 1 or more Ingredient (B): An aromatic polycarbonate Ingredient (C): An inorganic sheet-like filler of 0.5 to 20 $\mu$m in average grain size Ingredient (D): A polyester composed of dicarboxylic acid components with terephthalic acid component as a main dicarboxylic acid component and ethylene glycol component (I) and 1,4-cyclohexanedimethanol component (II) as main glycol components, with the molar ratio (I)/(II) of ethylene glycol component (I) to 1,4-cyclohexanedimethanol component (II) kept at smaller than 1.

(16) A sheet, stated in the above (15), wherein the thermoplastic resin composition consists of 100 parts by weight, in total, of the ingredients (A) and (B) and 2 to 25 parts by weight of the ingredient (C).

(17) A sheet, stated in the above (15), wherein the thermoplastic resin composition consists of 100 parts by weight, in total, of the ingredients (A), (D) and (B) and 2 to 25 parts by weight of the ingredient (C).

(18) A sheet, stated in the above (17), wherein the thermoplastic resin composition has a dispersed structure in which a phase mainly consisting of the ingredients (A) and (D) exists as a continuous phase.

(19) A sheet, stated in the above (17), wherein the thermoplastic resin composition has a dispersed structure in which a phase mainly consisting of the ingredients (D) and (B) exists as a continuous phase.

(20) A sheet, stated in any one of the above (15) through (19), wherein the sheet-like filler is talc.

(21) A multi-layer sheet, comprising a sheet made of a thermoplastic resin composition consisting of the following ingredients (A) and (B) at least as one layer:

Ingredient (A): A polyester composed of dicarboxylic acid components with terephthalic acid component as a main dicarboxylic acid component and ethylene glycol component (I) and 1,4-cyclohexanedimethanol component (II) as main glycol components, with the molar ratio (I)/(II) of ethylene glycol component (I) to 1,4-cyclohexanedimethanol component (II) kept at 1 or more Ingredient (B): An aromatic polycarbonate

(22) A multi-layer sheet, stated in the above (21), wherein the thermoplastic resin composition further contains the following ingredient (D):

Ingredient (D): A polyester composed of dicarboxylic acid components with terephthalic acid component as a main dicarboxylic acid component and ethylene glycol component (I) and 1,4-cyclohexanedimethanol component (II) as main glycol components, with the molar ratio (I)/(II) of ethylene glycol component (I) to 1,4-cyclohexanedimethanol component (II) kept at smaller than 1.

(23) A multi-layer sheet, stated in the above (22), wherein the thermoplastic resin composition has a dispersed structure in which a phase mainly consisting of the ingredients (A) and (D) exists as a continuous phase.

(24) A multi-layer sheet, stated in the above (22), wherein the thermoplastic resin composition has a dispersed structure in which a phase mainly consisting of the ingredients (D) and (B) exists as a continuous phase.

(25) A multi-layer sheet, stated in any one of the above (21) through (24), which is embossed.

(26) A multi-layer sheet, comprising a sheet made of a thermoplastic resin composition consisting of 100 parts by weight of one or more thermoplastic resins selected from the ingredients (A), (B) and (D) and 2 to 25 parts by weight of the following ingredient (C):

Ingredient (A): A polyester composed of dicarboxylic acid components with terephthalic acid component as a main dicarboxylic acid component and ethylene glycol component (I) and 1,4-cyclohexanedimethanol component (II) as main glycol components, with the molar ratio (I)/(II) of ethylene glycol component (I) to 1,4-cyclohexanedimethanol component (II) kept at 1 or more Ingredient (B): An aromatic polycarbonate Ingredient (C): An inorganic sheet-like filler of 0.5 to 20 μm in average grain size Ingredient (D): A polyester composed of dicarboxylic acid components with terephthalic acid component as a main dicarboxylic acid component and ethylene glycol component (I) and 1,4-cyclohexanedimethanol component (II) as main glycol components, with the molar ratio (I)/(II) of ethylene glycol component (I) and 1,4-cyclohexanedimethanol component (II) kept at smaller than 1.

(27) A multi-layer sheet, stated in the above (26), wherein the thermoplastic resin composition consists of 100 parts by weight, in total, of the ingredients (A) and (B) and 2 to 25 parts by weight of the ingredient (C).

(28) A multi-layer sheet, stated in the above (26), wherein the thermoplastic resin composition consists of 100 parts by weight, in total, of the ingredients (A), (D) and (B) and 2 to 25 parts by weight of the ingredient (C).

(29) A multi-layer sheet, stated in the above (28), wherein the thermoplastic resin composition has a dispersed structure in which a phase mainly consisting of the ingredients (A) and (D) exists as a continuous phase.

(30) A multi-layer sheet, stated in the above (28), wherein the thermoplastic resin composition has a dispersed structure in which a phase mainly consisting of the ingredients (D) and (B) exists as a continuous phase.

(31) A multi-layer sheet, stated in any one of the above (26) through (30), wherein the sheet-like filler is talc.

(32) A multi-layer sheet, stated in any one of the above (26) through (31), wherein a sheet made of a thermoplastic resin composition consisting of one or more selected from the ingredients (A), (B) and (D), and the ingredient (C) is provided as an inner layer.

(33) A multi-layer sheet, stated in the above (32), wherein a sheet made of a thermoplastic resin composition consisting of the ingredients (A) and (B) is provided as a surface layer.

(34) A multi-layer sheet, stated in the above (33), wherein the thermoplastic resin composition consisting of the ingredients (A) and (B) further contains the ingredient (D).

(35) A multi-layer sheet, stated in the above (34), wherein the thermoplastic resin composition consisting of the ingredients (A), (B) and (D) has a dispersed structure in which a phase mainly consisting of the ingredients (A) and (D) exists as a continuous phase.

(36) A multi-layer sheet, stated in the above (34), wherein the thermoplastic resin composition consisting of the ingredients (A), (B) and (D) has a dispersed structure in which a phase mainly consisting of the ingredients (D) and (B) exists as a continuous phase.

(37) A multi-layer sheet, stated in any one of the above (26) through (36), which is embossed.

The present invention is also:

(38) A card, stated in any one of the above (1) through (9), which is produced by injection molding of the thermoplastic resin composition.

The present invention is also:

(39) A thermoplastic resin composition, comprising the following ingredients (A), (D) and (B):

Ingredient (A): A polyester composed of dicarboxylic acid components with terephthalic acid component as a main dicarboxylic acid component and ethylene glycol component (I) and 1,4-cyclohexanedimethanol component (II) as main glycol components, with the molar ratio (I)/(II) of ethylene glycol component (I) to 1,4-cyclohexanedimethanol component (II) kept at 1 or more Ingredient (B): An aromatic polycarbonate Ingredient (D): A polyester composed of dicarboxylic acid components with terephthalic acid component as a main dicarboxylic acid component and ethylene glycol component (I) and 1,4-cyclohexanedimethanol component (II) as main glycol components, with the molar ratio (I)/(II) of ethylene glycol component (I) to 1,4-cyclohexanedimethanol component (II) kept at smaller than 1.

(40) A thermoplastic resin composition, stated in the above (39), which has a dispersed structure in which a phase mainly consisting of the ingredients (A) and (D) exists as a continuous phase.

(41) A thermoplastic resin composition, stated in the above (39), which has a dispersed structure in which a phase mainly consisting of the ingredients (D) and (B) exists as a continuous phase.

(42) A thermoplastic resin composition, comprising 100 parts by weight of one or more thermoplastic resin compositions selected from the following ingredients (A), (B) and (D) and 2 to 25 parts by weight of the following ingredient (C):

Ingredient (A): A polyester composed of dicarboxylic acid components with terephthalic acid component as a main dicarboxylic acid component and ethylene glycol component (I) and 1,4-cyclohexanedimethanol component (II) as main glycol components, with the molar ratio (I)/(II) of ethylene glycol component (I) to 1,4-cyclohexanedimethanol component (II) kept at 1 or more Ingredient (B): An aromatic polycarbonate Ingredient (C): An inorganic sheet-like filler of 0.5 to 20 μm in average grain size Ingredient (D): A polyester composed of dicarboxylic acid components with terephthalic acid component as a main dicarboxylic acid component and ethylene glycol component (I) and 1,4-cyclohexanedimethanol component (II) as main glycol components, with the molar ratio (I)/(II) of ethylene glycol component (I) to 1,4-cyclohexanedimethanol component (II) kept at smaller than 1.

(43) A thermoplastic resin composition, stated in the above (42), which consists of 100 parts by weight, in total, of the ingredients (A) and (B) and 2 to 25 parts of the ingredient (C).

(44) A thermoplastic resin composition, stated in the above (42), which consists of 100 parts by weight, in total, of the ingredients (A), (D) and (B) and 2 to 25 parts by weight of the ingredient (C).

(45) A thermoplastic resin composition, stated in the above (44), which has a dispersed structure in which a phase mainly consisting of the ingredients (A) and (D) exists as a continuous phase.

(46) A thermoplastic resin composition, stated in the above (44), which has a dispersed structure in which a phase mainly consisting of the ingredients (D) and (B) exists as a continuous phase.

THE MOST PREFERRED EMBODIMENTS OF THE INVENTION

A card in the present invention refers to a molded rectangular sheet of 10 mm to 300 mm in long side length and 10 mm to 200 mm in short side length (the long side length can also be equal to the short side length, that is, the sheet can also be square) and of 50 to 5000 $\mu$m in thickness, and a molded sheet larger than the card in any of the dimensions is called a sheet. A preferable card has a rectangular form of 50 to 100 mm in long side length and 25 to 80 mm in short side length and 400 to 2000 $\mu$m in thickness, and a more preferable card has a rectangular form of about 85 mm in long side length and about 54 mm in short side length and 600 to 900 $\mu$m in thickness.

The card in the present invention refers to a card which can generally record information, and is especially suitable as a card which can electrically, optically or magnetically record readable and/or writable information, and/or can record information by embossing. Specifically, preferable cards include magnetic cards, optical cards, etc. such as a contact type IC card (smart card), non-contact type IC card with an IC chip embedded in it and magnetically striped card. In view of applications, the cards include prepaid cards, credit cards, banking cards, various identification cards, etc.

The cards of the present invention are excellent in the balance among heat resistance, processability and embossability and can very practically endure the use under severe conditions.

The cards of the present invention can be produced, preferably by molding a thermoplastic resin composition into a sheet, and cutting it into cards, or laminating such sheets to form a multi-layer sheet, and cutting it into cards. A sheet secondarily processed by press molding, etc. can also be processed into cards. Furthermore, a thermoplastic resin composition may be melt-kneaded and pelletized, and processed into cards by publicly known press molding, but the production of cards by injection molding is preferable.

For production of a sheet, any publicly known methods such as T die method and inflation method can be used. The sheet of the present invention can be a single-layer sheet or obtained by laminating two or more sheets of the same or different kinds. For laminating two or more sheets, known methods such as co-extrusion method, heat lamination method and hot melt method can be used as desired. Since the sheets of the present invention can be thermally fused at a low temperature, heat lamination method can be preferably used.

The thickness of the sheet in the present invention is not especially limited. In the case of a single-layer sheet, the thickness is preferably 50 to 5000 $\mu$m, more preferably 100 to 1000 $\mu$m. In the case of a laminate consisting of two or more sheets, the entire thickness is preferably 150 to 5000 $\mu$m, more preferably 300 to 1000 $\mu$m. The thicknesses of respective sheets can be properly decided, depending on the number of sheets laminated, the entire thickness, decorative effect, etc.

The thermoplastic resin composition used as the material of the cards and sheets of the present invention is any one of the following compositions I to III.

I. Composition consisting of the following ingredients (A) and (B)

II. Composition consisting of the following ingredients (A), (B) and (D)

III. Composition consisting of 100 parts by weight, in total, of the following ingredients (A), (B) and (D) and 2 to 25 parts by weight of the following ingredient (C)

(In the above I to III, the ingredient A is a polyester composed of dicarboxylic acid components with terephthalic acid component as a main dicarboxylic acid component and ethylene glycol component (I) and 1,4-cyclohexanedimethanol component (II) as main glycol components, with the molar ratio (I)/(II) of ethylene glycol component (I) to 1,4-cyclohexanedimethanol component (II) kept at 1 or more;

the ingredient B is an aromatic polycarbonate;

the ingredient C is an inorganic sheet-like filler of 0.5 to 20 $\mu$m in average grain size; and the ingredient (D) is a polyester composed of dicarboxylic acid components with terephthalic acid component as a main dicarboxylic acid component and ethylene glycol component (I) and 1,4-cyclohexanedimethanol component (II) as main glycol components, with the molar ratio (I)/(II) of ethylene glycol component (I) to 1,4-cyclohexanedimethanol component (II) kept at smaller than 1.)

At first, the ingredients (A) through (D) are described below.

In the present invention, the ingredient (A) is a polyester composed of dicarboxylic acid components with terephthalic acid component as a main dicarboxylic acid component and ethylene glycol component (I) and 1,4-cyclohexanedimethanol component (II) as main glycol components, with the molar ratio (I)/(II) of ethylene glycol component (I) to 1,4-cyclohexanedimethanol component (II) kept at 1 or more.

The ingredient (A), preferably, has the molar ratio (I)/(II) of ethylene glycol component (I) to 1,4-cyclohexanedimethanol component (II) kept at 90/10~60/40, more preferably 75/25~65/35 in the glycol components, and contains terephthalic acid as an acid component.

In the present invention, the ingredient (D) is a polyester composed of dicarboxylic acid components with terephthalic acid component as a main dicarboxylic acid component and ethylene glycol component (I) and 1,4-cyclohexanedimethanol component (II) as main glycol components, with the molar ratio (I)/(II) of ethylene glycol component (I) to 1,4-cyclohexanedimethanol component (II) kept at smaller than 1.

The ingredient (D), preferably, has the molar ratio (I)/(II) of ethylene glycol component (I) to 1,4-cyclohexanedimethanol component (II) at 2/3 or less in the glycol components, and can contain isophthalic acid component in addition to terephthalic acid component as acid components. More preferably, it has the molar ratio (I)/(II)

of ethylene glycol component (I) to 1,4-cyclohexanedimethanol component (II) kept at 30/70~40/60, and contains terephthalic acid component as an acid component.

In the present invention, the method for producing the 1,4-cyclohexanedimethanol derivative copolymerized polyesters used as the ingredients (A) and (D) is not especially limited. For example, they can be produced by polycondensing terephthalic acid or any of its lower alkyl esters, 1,4-cyclohexanedimethanol and ethylene glycol in the presence of absence of a catalyst such as an organic titanium compound. As the polymerization conditions, for example, the conditions stated in U.S. Pat. No. 2,901,466 can be applied.

In the present invention, the 1,4-cyclohexanedimethanol derivative copolymerized polyesters used as the ingredients (A) and (D) can have usually 20 mol % or less, preferably 10 mol % or less of another dicarboxylic acid such as isophthalic acid, orthophthalic acid, 2,6-naphthalenedicarboxylic acid, 2,7-naphthalenedicarboxylic acid, 1,5-naphthalenedicarboxylic acid, methylterephthalic acid, 4,4'-biphenyldicarboxylic acid, 2,2'-biphenyldicarboxylic acid, 1,2'-bis(4-carboxyphenoxy)-ethane, succinic acid, adipic acid, suberic acid, azelaic acid, sebacic acid, dodecanedionic acid, octadecanedicarboxylic acid, dimeric acid or 1,4-cyclohexanedicarboxylic acid as another acid component, and another glycol such as propylene glycol, 1,5-pentanediol, 1,6-hexanediol, 1,8-octanediol, 1,10-decanediol, 1,3-cyclohexanedimethanol, 1,2-cyclohexanedimethanol or 2,2-bis(2'-hydroxyethoxyphenyl) propane as another glycol component, respectively copolymerized, as far as the effect of the present invention is not impaired.

The aromatic polycarbonate used as the ingredient (B) in the present invention is preferably produced with at least one or more selected from 2,2'-bis(4-hydroxyphenyl)propane (bisphenol A), 4,4'-dihydroxydiphenylalkane, 4,4'-dihydroxydiphenylsulfone and 4,4'-dihydroxydiphenyl ether as a main raw material, and among them, an aromatic polycarbonate produced with bisphenol A as a main raw material is preferable. Concretely, a polycarbonate obtained by the ester interchange method or phosgene method using said bisphenol A as a dihydroxy component is preferable. Furthermore, a polycarbonate obtained by using bisphenol A partially (preferably by 10 mol % or less) substituted by 4,4'-dihydroxydiphenylalkane, 4,4'-dihydroxydiphenylsulfone or 4,4'-dihydroxydiphenyl ether, etc. is also preferable.

In the present invention, the inorganic sheet-like filler as the ingredient (C) is preferably a filler of three-dimensionally anisotropic and biaxially oriented grains. It can be selected, for example, from talc, kaolin, mica, sericite, basic magnesium carbonate, aluminum hydroxide, glass flakes, etc. Two or more of these fillers can also be used together. Among these fillers, talc and kaolin are preferable, and talc is most preferable.

The average grain size of the inorganic sheet-like filler is preferably, 0.5 to 20 μm, more preferably 1 to 10 μm in the stage before mixing. If the grain size is in this range, the moldability of the thermoplastic resin composition into a sheet and cards is good, and the effect for improving embossability is high. Furthermore, transparency is also excellent.

The average grain size of the inorganic sheet-like filler can be measured by the centrifugal precipitation method.

The inorganic sheet-like filler can also be treated on the surfaces of its grains by a coupling agent such as an isocyanate based compound, organic silane based compound, organic titanate based compound, organic borane based compound or epoxy compound.

The compositions I to III are described below.

The composition I consists of the ingredients (A) and (B). The composition I is good in heat resistance and allows thermal fusion at a relatively low temperature. Therefore, the composition is especially useful as a material to be used as at least one layer of a multi-layer sheet, and is also suitable for cards obtained by processing it.

The mixing ratio of the ingredients (A) and (B) in the composition I is not especially limited, and in the case of a dispersed structure in which the ingredient (A) exists as a continuous phase or in the case of a dispersed structure in which the ingredient (B) exists as a continuous phase, the composition can have both high heat resistance and high processability. In a dispersed structure, it can happen that the ingredient (B) exists as a dispersed phase in a continuous phase formed by the ingredient (A), or that both the ingredients (A) and (B) exist as continuous phases, or that the ingredient (A) exists as a dispersed phase in a continuous phase formed by the ingredient (B). A dispersed structure refers to any multi-phase structure other than a single phase.

As for the mixing ratio in this case, it is preferable that the amount of the ingredient (A) is 10 to 90 wt % while the amount of the ingredient (B) is 90 wt % to 10 wt % based on the total weight of the ingredients (A) and (B). In this mixing ratio range, cards and a multi-layer sheet excellent in both heat resistance and processability can be obtained. Especially if the amount of the ingredient (A) is 50 to 90 wt % while the amount of the ingredient (B) is 50 to 10 wt %, the ingredient (A) is likely to form a continuous phase, and the thermoplastic resin composition allows thermal fusion at a low temperature of 110 to 130° C. On the other hand, if the amount of the ingredient (A) is 10 to 50 wt % while the amount of the ingredient (B) is 90 to 50 wt %, the ingredient (B) is likely to form a continuous phase, and the thermoplastic resin composition allows thermal fusion at a practical temperature of 130 to 150° C. even though excellent in heat resistance.

The composition II consists of the ingredients (A), (B) and (D). The composition is preferably further higher in processability and heat resistance than the composition I, since it further contains the ingredient (D).

The mixing ratio of the respective ingredients in the composition II is not especially limited. In the case of a dispersed structure in which a phase mainly consisting of the ingredients (A) and (B) exists as a continuous phase or in the case of a dispersed structure in which a phase mainly consisting of the ingredients (B) and (D) exists as a continuous phase, heat resistance is especially high. In such a dispersed structure, it can happen that a phase mainly consisting of the ingredients (B) and (D) exists as a dispersed phase in a continuous phase mainly consisting of the ingredients (A) and (D), or that a phase mainly consisting of the ingredients (A) and (D) and a phase mainly consisting of the ingredients (B) and (D) exist as continuous phases, or that a phase mainly consisting of the ingredients (A) and (D) exist as a dispersed phase in a continuous phase mainly consisting of the ingredients (B) and (D).

In this case, as for the amounts of the respective ingredients, the amount of the ingredient (B) is preferably 10 to 900 parts by weight, more preferably 20 to 500 parts by weight based on 100 parts by weight in total of the ingredients (A) and (D).

Especially when the amount of the ingredient (B) is 10 to 100 parts by weight based on 100 parts by weight in total of the ingredients (A) and (D), a dispersed structure in which a phase mainly consisting of the ingredients (A) and (D) exists as a continuous phase is likely to be obtained, and high processability can be assured preferably. Furthermore, if the amount of the ingredient (B) is more than 100 parts by weight to 900 parts by weight based on 100 parts by weight in total of the ingredients (A) and (D), a dispersed structure in which a phase mainly consisting of the ingredients (B) and (D) exists as a continuous phase is likely to be obtained, and higher heat resistance can be assured preferably.

In this case, the ratio by weight (A)/(D) of the ingredient (A) to the ingredient (D) is preferably 90/10~30/70, more preferably 80/20~50/50, and in this range, an especially good dispersed structure can be obtained.

The composition III consists of 100 parts by weight of one or more selected from the ingredients (A), (B) and (D), and 2 to 25 parts by weight of the ingredient (C). Since the composition III contains the ingredient (C), embossability is greatly improved preferably without lowering heat resistance and processability.

In the composition III, it is preferable to use at least the ingredient (A) or (D), especially the ingredient (A). Furthermore, it is preferable to use at least two or more of the ingredients (A), (B) and (D).

Especially preferable combinations for the compound III include a composition consisting of the ingredients (A), (B) and (C) and a composition consisting of the ingredients (A), (B), (C) and (D). Among them, a composition consisting of the ingredients (A), (B), (C) and (D) is especially preferable.

The amount of the ingredient (C) is 2 to 25 parts by weight, preferably 4 to 15 parts by weight based on 100 parts by weight in total of the ingredients (A), (B) and (D) (if any ingredient is not contained, the amount of the ingredient is 0 part by weight for calculating the total amount). If the amount is in this range, moldability is good, and a good sheet and cards can be obtained. Furthermore, the effect for improving embossability is high, and transparency is also excellent.

When two or more are selected from the ingredients (A), (B) and (D), the ratio of the respective ingredients is optional. When the ingredients (A) and (B) are used together, or when all of the ingredients (A), (B) and (D) are used together, the preferable mixing ratios and modes stated for the above compositions I and II can be adopted.

In the present invention, the method for blending the respective ingredients is not especially limited, and any publicly known method can be used. Specifically a single-screw or double-screw extruder can be used for homogenous melt-kneading. As another method, specific ingredients only can be preliminarily kneaded, and the kneaded mixture as a masterbatch can be kneaded with the remaining ingredients.

The composition of the present invention can also contain other various additives as far as the object of the present invention is not impaired. These other additives include a reinforcing material such as glass fibers, carbon fibers, asbestos fibers, rock wool, calcium carbonate, quartz sand, bentonite, clay, wollastonite, barium sulfate, glass beads, mica and titanium oxide, filler, antioxidant (phosphorus based, sulfur based, etc.), ultraviolet absorbent, thermal stabilizer (hindered phenol based, etc.), lubricant, releasing agent, antistatic agent, anti-blocking agent, colorant including dye and pigment, flame retarder (halogen based, phosphorus based, etc.), flame retarding aid (antimony compound such as antimony trioxide, zirconium oxide, molybdenum oxide, etc.), foaming agent, crosslinking agent (e.g., polyepoxy compound, isocyanate compound, acid anhydride, etc.), etc. Furthermore, any other synthetic resin (e.g., polyamide resin, polystyrene resin, acrylic resin, polyethylene resin, ethylene/vinyl acetate copolymer, phenoxy resin, epoxy resin, silicone resin, etc.) can also be contained.

The thermoplastic resin composition can be made opaque by adding, for example, titanium oxide, etc. When it is used as cards capable of recording information such as magnetic cards and IC cards, usually 2 to 25 parts by weight of titanium oxide can be added based on 100 parts by weight, in total, of the ingredients (A) to (D), for making the composition opaque.

The thermoplastic resin composition can be molded into a sheet, and such sheets can be further laminated into a multi-layer sheet.

In the case of a multi-layer sheet, at least one layer is formed by said composition I, II or III. As the composition III, a thermoplastic resin composition consisting of 100 parts by weight of one or more selected from the ingredients (A), (B) and (D) and 2 to 25 parts by weight of the ingredient (C) is preferable, and especially, a thermoplastic resin composition consisting of 100 parts by weight, in total, of the ingredients (A) and (B) and 2 to 25 parts by weight of the ingredient (C), and a thermoplastic resin composition consisting of 100 parts by weight, in total, of the ingredients (A), (B) and (D) and 2 to 25 parts by weight of the ingredient (C) are preferable.

Other preferable modes are also the same as described in detail for the compositions I to III.

The materials of the other layers are not especially limited, and such materials as paper, cloth and synthetic resins (e.g., polyolefin resins, polyamide resins, polyimide resins, polyester resins, polyvinyl chloride resin, vinyl chloride/vinyl acetate copolymer resin, ABS resin, etc.) can be used. Between the respective layers, as required, an adhesive layer can also be formed. Furthermore, the respective layers can be printed, and also be coated with a magnetic material. The magnetic layer can exist over the entire sheet or partially on the sheet as stripes.

To produce a multi-layer sheet of the present invention by heat lamination, sheets of a material to allow thermal fusion in a temperature range of 110 to 150° C., for example, amorphous polyester sheets can be preferably used.

An amorphous polyester can be a polyester of 5 cal/g or less in crystallization calorie when cooled from a molten state at a rate of 10° C./min by a differential scanning calorimeter.

The amorphous polyester sheets to be laminated can be sheets of an amorphous polyester alone or of a composition containing an amorphous polyester. The amorphous polyester can be selected from amorphous polyethylene terephthalate, polyethylene terephthalate copolymer, 1,4-cyclohexanedimethanol derivative copolymerized polyesters, etc. Any of these amorphous polyesters can be used as a mixture with another amorphous polymer. The amorphous polymer can be an aromatic polycarbonate or amorphous polyester, etc., and among them, an aromatic polycarbonate is preferable. The amount of the amorphous polymer to be added is preferably 10 to 90 wt %.

The multi-layer sheet of the present invention consists of two or more layers. It is preferable that the thickness of the sheet made of the composition I, the sheet made of the composition II or the sheet made of the composition III is at least 50% or more of all the sheets. It is more preferable that all the sheets are sheets made of the composition I, sheets made of the composition II or sheets made of the composition III, and these laminated sheets can be of the same material or different materials.

If a sheet not containing the ingredient (C) is used as the surface layer, the multi-layer sheet is preferably excellent in appearance since the sheet is very excellent in transparency. A sheet containing the ingredient (C) is suitable for cards, since it is very excellent in embossability. Therefore, If a sheet made of the composition III as a sheet containing the ingredient (C) is used as an inner layer and a sheet made of the composition I or II is used as the surface layer, the multi-layer sheet is excellent in both heat resistance and embossability.

EXAMPLES

The effects of the present invention are described further below in reference to examples.

Examples 1 to 8

The raw materials stated in Table 1 were dry-blended at a ratio stated in Table 1, using a V blender, and the blend was fed unto an extruder, and discharged from a T die, to obtain sheets of 100 μm and 600 μm in thickness. The sheet-like filler was preliminarily kneaded, and supplied as a masterbatch.

The sheets of 100 μm and 600 μm in thickness were fed into a press molding machine, and held at the temperature stated in Table 1 at a pressure of 1 MPa for 10 minutes, to be thermally fused, and the adhesiveness was examined. In Table 1, a laminate which could be separated by hand was expressed by x, and a laminate which could not be separated by hand, by o. The ingredient (A) used was a polyester consisting of terephthalic acid component, ethylene glycol component and 1,4-cyclohexanedimethanol component, with the molar ratio (I)/(II) of ethylene glycol component (I) to 1,4-cyclohexanedimethanol component (II) kept at about 70/30 ("Easter" GN071 produced by Eastman Chemical). The ingredient (B) used was "Yupiron" S3000 produced by Mitsubishi Engineering Plastics K.K. The ingredient (C) used was talc LMS-300 produced by Fuji Talc Kogyo K.K. (1.4 μm in average grain size). The ingredient (D) used was a polyester consisting of terephthalic acid component, ethylene glycol component and 1,4-cyclohexanedimethanol component, with the molar ratio (I)/(II) of ethylene glycol component (I) to 1,4-cyclohexanedimethanol component (II) kept at about 35/65 ("Easter" DN003 produced by Eastman Chemical).

The dispersion mode of the two-layer sheet was observed by a transmission electron microscope, and the observed mode is shown in Table 1.

Comparative Examples 1 to 4

Two-layer sheets were produced as described in Examples 1, 2, 5 and 6, except that poly(1,4-cyclohexanedimethanol terephthalate-co-isophthalate) was used as the ingredient (A) instead of the polyester consisting of terephthalic acid component, ethylene glycol component and 1,4-cyclohexanedimethanol component, with the molar ratio (I)/(II) of ethylene glycol component (I) to 1,4-cyclohexanedimethanol component (II) kept at about 70/30, and the adhesiveness was examined under the same conditions as in Example 1.

TABLE 1

|  | Composition | | | | | Dispersion mode | | Fusion temperature (° C.) | Adhesiveness between the same sheets |
| --- | --- | --- | --- | --- | --- | --- | --- | --- | --- |
|  | A (wt %) | B (wt %) | C (wt %) | D (wt %) | E (wt %) | Continuous phase | Dispersed phase | | |
| Example 1 | 70 | 30 | — | — | — | A | B | 120 | ◯ |
| Example 2 | 35 | 30 | — | 35 | — | A + D | B + D | 120 | ◯ |
| Example 3 | 63 | 27 | 10 | — | — | A + C | B + C | 120 | ◯ |
| Example 4 | 40 | 27 | 10 | 23 | — | A + D + C | B + D + C | 120 | ◯ |
| Example 5 | 30 | 70 | — | — | — | B | A | 145 | ◯ |
| Example 6 | 15 | 70 | — | 15 | — | B + D | A + D | 145 | ◯ |
| Example 7 | 27 | 63 | 10 | — | — | B + C | A + C | 145 | ◯ |
| Example 8 | 18 | 63 | 10 | 9 | — | B + D + C | A + D + C | 145 | ◯ |
| Comparative example 1 | — | 30 | — | — | 70 | Single phase | | 120 | × |
| Comparative example 2 | — | 30 | — | 35 | 35 | Single phase | | 120 | × |
| Comparative example 3 | — | 70 | — | — | 30 | Single phase | | 145 | × |
| Comparative example 4 | — | 70 | — | 15 | 15 | Single phase | | 145 | × |

A: Poly(ethylene-co-1,4-cyclohexanedimethylene terephthalate), Easter GN071 produced by Eastman Chemical
B: Aromatic polycarbonate, Yupiron S3000 produced by Mitsubishi Gas Chemical Co., Inc.
C: Inorganic sheet-like filler, Talc LMS-300 produced by Fuji Talc Kogyo
D: Poly(ethylene-co-1,4-cyclohexanedimethylene terephthalate), Easter DN003 produced by Eastman Chemical
E: Poly(1,4-cyclohexanedimethanol terephthalate-co-isophthalate), Easter 6761 produced by Eastman Chemical

Comparative Example 5

A 1 mm thick hard polyvinyl chloride sheet (Takiron ESS8800A) was fed into a press molding machine, to produce sheets of 100 μm and 600 μm in thickness at a temperature of 230° C. and at a pressure of 1 MPa.

The sheets of 100 μm and 600 μm in thickness were fed into a press molding machine, and held at a temperature of 120° C. and at a pressure of 1 MPa for 10 minutes, to be thermally fused. The adhesiveness was examined. The two-layer sheet had not been fused, and could be separated.

Examples 9 to 13, and Comparative Examples 6 and 7

The raw materials stated in Table 2 were dry-blended at a ratio stated in Table 2 using a V blender, and the blend was fed into an extruder and pelletized at 270° C., to obtain a thermoplastic resin composition. The thermoplastic resin composition was molded into 100 mm×100 mm×0.8 mm cards by press molding at a temperature of 230° C. and at a pressure of 1 MPa.

From the cards, specimens of 85 mm×54 mm were cut out, to evaluate heat resistance by a heat sag test. Specifically, a one-end area of 20 mm×54 mm was supported horizontally in a hot air oven of 105° C., and 60 minutes later, the sag distance at the tip of the specimen was measured.

TABLE 2

| | Composition | | | | Sheet lamination mode | Deformation in heat sag test (mm) |
|---|---|---|---|---|---|---|
| | A (wt %) | B (wt %) | C (wt %) | D (wt %) | | |
| Example 9 | 35 | 30 | — | 35 | Single sheet | 7 |
| Example 10 | 50 | 30 | — | 20 | Single sheet | 9 |
| Example 11 | 63 | 27 | 10 | — | Single sheet | 18 |
| Example 12 | 32 | 27 | 10 | 31 | Single sheet | 5 |
| Example 13 | 45 | 27 | 10 | 18 | Single sheet | 7 |
| Comparative example 6 | — | 30 | — | 70 | Single sheet | 43 |
| Comparative example 7 | 100 | — | — | — | Single sheet | Vertical sag |

A: Poly(ethylene-co-1,4-cyclohexanedimethylene terephthalate), Easter GN07 produced by Eastman Chemical
B: Aromatic polycarbonate, Yupiron S3000 produced by Mitsubishi Gas Chemical Co., Inc.
C: Inorganic sheet-like filler, Talc LMS-300 produced by Fuji Talc Kogyo K.K.
D: Poly(ethylene-co-1,4-cyclohexanedimethylene terephthalate), Easter DN003 produced by Eastman Chemical

TABLE 3

| | Composition | | | | Sheet lamination mode | Deformation in heat sag test (mm) |
|---|---|---|---|---|---|---|
| | A (wt %) | B (wt %) | C (wt %) | D (wt %) | | |
| Example 14 | 15 | 70 | — | 15 | Single sheet | 2 |
| Example 15 | 25 | 70 | — | 5 | Single sheet | 1 |
| Example 16 | 27 | 63 | 10 | — | Single sheet | 10 |
| Example 17 | 14 | 63 | 10 | 13 | Single sheet | 1 |
| Example 18 | 23 | 63 | 10 | 4 | Single sheet | 1 |
| Comparative example 8 | — | 70 | — | 30 | Single sheet | 38 |
| Comparative example 9 | 100 | — | — | — | Single sheet | Vertical sag |

A: Poly(ethylene-co-1,4-cyclohexanedimethylene terephthalate), Easter GN07 produced by Eastman Chemical
B: Aromatic polycarbonate, Yupiron S3000 produced by Mitsubishi Gas Chemical Co., Inc.
C: Inorganic sheet-like filler, Talc LMS-300 produced by Fuji Talc Kogyo K.K.
D: Poly(ethylene-co-1,4-cyclohexanedimethylene terephthalate), Easter DN003 produced by Eastman Chemical Examples 14 to 18, and Comparative Examples 8 and 9

The raw materials stated in Table 3 were dry-blended at a ratio stated in Table 3 using a V blender, and the blend was fed into an extruder and pelletized at 270° C., to obtain a thermoplastic resin composition. The thermoplastic resin composition was molded into cards of 100 mm×100 mm×0.8 mm press molding at a temperature of 230° C. and at a pressure of 1 MPa.

From the cards, specimens of 85 mm×54 mm were cut out, to evaluate heat resistance by a heat sag test. Specifically, a one-end area of 20 mm×54 mm was supported horizontally in a hot air oven of 135° C., and 60 minutes later, the sag distance at the tip of the specimen was measured.

Examples 19 to 26, and Comparative Example 10

The raw materials stated in Table 4 were dry-blended at a ratio stated in Table 4 using a V blender, and the blend was fed into an extruder, and discharged from a T die, to obtain sheets of 100 μm and 300 μm in thickness.

The sheets of 100 μm and 300 μm in thickness were overlapped in the order of 100/300/300/100 μm ("/" expresses lamination), and the laminate was fed into a press molding machine and held at a temperature of 120° C. and at a pressure of 1 MPa for 10 minutes, to be thermally fused. In Examples 19 to 24, sheets of the same kind were laminated. In Examples 25 and 26, sheets containing an inorganic sheet-like filler were used as the inner layers and sheets not containing any inorganic sheet-like filler were used as the surface layers.

From the four-layer sheet, specimens of 85 mm×54 mm×0.8 mm were cut out, to evaluate heat resistance by a heat sag test. Specifically, a one-end area of 20 mm×54 mm was supported horizontally in a hot air oven of 105° C., and 60 minutes later, the sag distance at the tip of the specimen was measured.

TABLE 4

| | Composition | | | | Sheet lamination | Deformation in heat sag test (mm) |
|---|---|---|---|---|---|---|
| | A (wt %) | B (wt %) | C (wt %) | D (wt %) | | |
| Example 19 | 70 | 30 | — | — | Multi-layer sheet | 19 |
| Example 20 | 35 | 30 | — | 35 | Multi-layer sheet | 6 |
| Example 21 | 50 | 30 | — | 20 | Multi-layer sheet | 8 |
| Example 22 | 63 | 27 | 10 | — | Multi-layer sheet | 18 |
| Example 23 | 32 | 27 | 10 | 31 | Multi-layer sheet | 4 |

TABLE 4-continued

|  |  | Composition | | | | Sheet lamination mode | Deformation in heat sag test (mm) |
|---|---|---|---|---|---|---|---|
|  |  | A (wt %) | B (wt %) | C (wt %) | D (wt %) | | |
| Example 24 |  | 45 | 27 | 10 | 18 | Multi-layer sheet | 6 |
| Example 25 | Surface layer | 70 | 30 | — | — | Multi-layer sheet | 18 |
|  | Inner layer | 63 | 27 | — | — | Multi-layer sheet | |
| Example | Surface layer | 50 | 30 | 10 | 20 | Multi-layer sheet | 7 |
|  | Inner layer | 45 | 27 | 10 | 18 | Multi-layer sheet | |
| Comparative example 6 |  | — | 30 | — | 70 | Single | 43 |
| Comparative example 10 |  | 100 | — | — | — | Multi-layer sheet | Vertical sag |

A: poly(ethylene-co-1,4-cyclohexanedimethylene terephthalate), Easter GN071 produced by Eastman Chemical
B: Aromatic polycarbonate, Yupiron S3000 produced by Mitsubishi Gas Chemical Co., Inc.
C: Inorganic sheet-like filler, Talc LMS-300 produced by Fuji Talc Kogyo K.K.
D: Poly(ethylene-co-1,4-cyclohexanedimethylene terephthalate), Easter DN003 produced by Eastman Chemical Examples 27 to 34, and Comparative Example 11

The raw materials stated in Table 5 were dry-blended at a ratio stated in Table 5 using a V blender, and the blend was fed into an extruder, and discharged from a T die, to obtain sheets of 100 μm and 300 μm in thickness.

The sheets of 100 μm and 300 μm in thickness were overlapped in the order of 100/300/300/100 μm ("/" expresses lamination), and the laminate was fed into a press molding machine and held at a temperature of 145° C. and at a pressure of 1 MPa for 10 minutes, to be thermally fused.

In Examples 27 to 32, sheets of the same kind were laminated. In Examples 33 and 34, sheets containing an inorganic sheet-like filler were used as the inner layers, and sheets not containing any inorganic sheet-like filler were used as the surface layers.

From the four-layer sheet, specimens of 85 mm×54 mm×0.8 mm were cut out, to evaluate heat resistance by a heat sag test. Specifically, a one-end area of 20 mm×54 mm was supported horizontally in a hot air oven of 135° C., and 60 minutes later, the sag distance at the tip of the specimen was measured.

TABLE 5

|  |  | Composition | | | | Sheet lamination mode | Deformation in heat sag test (mm) |
|---|---|---|---|---|---|---|---|
|  |  | A (wt %) | B (wt %) | C (wt %) | D (wt %) | | |
| Example 27 |  | 30 | 70 | — | — | Multi-layer sheet | 12 |
| Example 28 |  | 15 | 70 | — | 15 | Multi-layer sheet | 2 |
| Example 29 |  | 25 | 70 | — | 5 | Multi-layer sheet | 1 |
| Example 30 |  | 27 | 63 | 10 | — | Multi-layer sheet | 8 |
| Example 31 |  | 14 | 63 | 10 | 13 | Multi-layer sheet | 1 |
| Example 32 |  | 23 | 63 | 10 | 4 | Multi-layer sheet | 1 |
| Example 33 | Surface layer | 30 | 70 | — | — | Multi-layer sheet | 10 |
|  | Inner layer | 27 | 63 | 10 | — | Multi-layer sheet | |
| Example 34 | Surface layer | 25 | 70 | — | 5 | Multi-layer sheet | 1 |
|  | Inner layer | 23 | 63 | 10 | 4 | Multi-layer sheet | |
| Comparative example 8 |  | — | 70 | — | 30 | Single sheet | 38 |

TABLE 5-continued

| | Composition | | | | Sheet lamination mode | Deformation in heat sag test (mm) |
|---|---|---|---|---|---|---|
| | A (wt %) | B (wt %) | C (wt %) | D (wt %) | | |
| Comparative example 11 | 100 | — | — | — | Multi-layer sheet | Vertical sag |

A: Poly(ethylene-co-1,4-cyclohexanedimethylene terephthalate), Easter GN071 produced by Eastman Chemical
B: Aromatic polycarbonate, Yupiron S3000 produced by Mitsubishi Gas Chemical Co., Inc.
C: Inorganic sheet-like filler, Talc LMS-300 produced by Fuji Talc Kogyo K.K.
D: Poly(ethylene-co-1,4-cyclohexanedimethylene terephthalate), Easter DN003 produced by Eastman Chemical Examples 35 to 39, and Comparative Examples 12 and 13

The raw materials stated in Table 6 were dry-blended at a ratio stated in Table 6 using a V blender, and the blend was fed into an extruder and pelletized at 270° C., to obtain a thermoplastic resin composition. The thermoplastic resin composition was fed into an injection molding machine, and molded into cards of 85 mm×54 mm×0.8 mm at a processing temperature of 275° C. and at a mold temperature of 60° C.

A one-end area of 20 mm×54 mm of a specimen was supported horizontally in a hot air oven of 105° C., and 60 minutes later, the sag distance at the tip of the specimen was measured.

TABLE 6

| | Composition | | | | Deformation in heat sag test (mm) |
|---|---|---|---|---|---|
| | A (wt %) | B (wt %) | C (wt %) | D (wt %) | |
| Example 35 | 35 | 30 | — | 35 | 8 |
| Example 36 | 50 | 30 | — | 20 | 10 |
| Example 37 | 63 | 27 | 10 | — | 18 |
| Example 38 | 32 | 27 | 10 | 31 | 6 |
| Example 39 | 45 | 27 | 10 | 18 | 8 |
| Comparative example 12 | — | 30 | — | 70 | 45 |
| Comparative example 13 | 100 | — | — | — | Vertical sag |

A: Poly(ethylene-co-1,4-cyclohexanedimethylene terephthalate), Easter GN07 produced by Eastman Chemical
B: Aromatic polycarbonate, Yupiron S3000 produced by Mitsubishi Gas Chemical Co., Inc.
C: Inorganic sheet-like filler, Talc LMS-300 produced by Fuji Talc Kogyo K.K.
D: Poly(ethylene-co-1,4-cyclohexanedimethylene terephthalate), Easter DN003 produced by Eastman Chemical Examples 40 to 44, and Comparative Examples 14 and 15

The raw materials stated in Table 7 were dry-blended at a ratio stated in Table 7 using a V blender, and the blend was fed into an extruder and pelletized at 270° C., to obtain a thermoplastic resin composition. The thermoplastic resin composition was fed into an injection molding machine, and molded into cards of 85 mm×54 mm×0.8 mm at a processing temperature of 275° C. and at a mold temperature of 60° C.

A one-end area of a specimen was supported horizontally in a hot air oven of 135° C., and 60 minutes later, the sag distance at the tip of the specimen was measured.

TABLE 7

| | Composition | | | | Deformation in heat sag test (mm) |
|---|---|---|---|---|---|
| | A (wt %) | B (wt %) | C (wt %) | D (wt %) | |
| Example 40 | 15 | 70 | — | 15 | 2 |
| Example 41 | 25 | 70 | — | 5 | 1 |
| Example 42 | 27 | 63 | 10 | — | 12 |
| Example 43 | 14 | 63 | 10 | 13 | 1 |
| Example 44 | 23 | 63 | 10 | 4 | 1 |
| Comparative example 14 | — | 70 | — | 30 | 40 |
| Comparative example 15 | 100 | — | — | — | Vertical sag |

A: Poly(ethylene-co-1,4-cyclohexanedimethylene terephthalate), Easter GN07 produced by Eastman Chemical
B: Aromatic polycarbonate, Yupiron S3000 produced by Mitsubishi Gas Chemical Co., Inc.
C: Inorganic sheet-like filler, Talc LMS-300 produced by Fuji Talc Kogyo K.K.
D: Poly(ethylene-co-1,4-cyclohexanedimethylene terephthalate), Easter DN003 produced by Eastman Chemical Examples 45 to 49, and Comparative Examples 16 to 18

The raw materials stated in Table 8 were dry-blended at a ratio stated in Table 8 using a V blender, and the blend was fed into an extruder and discharged from a T die, to obtain sheets of 100 μm and 300 μm in thickness.

The sheets of 100 μm and 300 μm were overlapped in the order of 100/300/300/100 μm ("/" expresses lamination), and the laminate was fed into a press molding machine and held at a pressure of 1 MPa for 10 minutes, to be thermally fused, thus obtaining cards of 85 mm×54 mm×0.8 mm.

The cards were embossed using a manual embosser (NE-1600 produced by Nippon Jikensha), and the warping of the cards was measured according to JIS X 6301.

In Examples 45 and 46 and Comparative Examples 16 and 17, cards were produced at a sheet molding temperature of 250° C. and at a thermal fusion temperature of 120° C. In Comparative Example 18, cards were produced at a sheet molding temperature of 270° C. and at a thermal fusion temperature of 200° C. In Examples 47 to 49, cards were produced at a sheet molding temperature of 260° C. and at a thermal fusion temperature of 200° C.

Table 8

| | Composition | | | | |
|---|---|---|---|---|---|
| | A (parts by weight) | B (parts by weight) | C (parts by weight) | D (parts by weight) | Warping of card (mm) |
| Example 45 | 100 | — | 11 | — | 1.4 |
| Example 46 | — | — | 11 | 100 | 1.5 |
| Example 47 | 50 | 50 | 11 | — | 1.6 |
| Example 48 | — | 50 | 11 | 50 | 1.7 |
| Example 49 | 25 | 50 | 11 | 25 | 1.6 |
| Comparative example 16 | 100 | — | — | — | 1.9 |
| Comparative example 17 | — | — | — | 100 | 2.0 |
| Comparative example 18 | — | 100 | — | — | 2.9 |

A: Poly(ethylene-co-1,4-cyclohexanedimethylene terephthalate), Easter GN07 produced by Eastman Chemical
B: Aromatic polycarbonate, Yupiron S3000 produced by Mitsubishi Gas Chemical Co., Inc.
C: Talc, Talc LMS-300 produced by Fuji Talc Kogyo K.K.
D: Poly(ethylene-co-1,4-cyclohexanedimethylene terephthalate), Easter DN003 produced by Eastman Chemical Examples 50 to 54, and Comparative Examples 19 to 21

The raw materials stated in Table 9 were dry-blended at a ratio stated in Table 9 using a V blender, and the blend was melt-kneaded and pelletized by a double-screw extruder, to obtain a resin composition. The composition was fed into an injection molding machine, to mold cards in conformity with JIS X 6301.

The cards were embossed using a manual embosser (NE-1600 produced by Nippon Jikensha), and the warping of cards was measured according to JIS X 6301.

In Examples 50 and 51 and Comparative Examples 19 and 20, cards were produced at a processing temperature of 270° C. and at a mold temperature of 40° C. In Comparative Example 21, cards were produced at a processing temperature of 280° C. and at a mold temperature of 90° C. In Examples 52 to 54, cards were produced at a processing temperature of 275° C. and at a mold temperature of 60° C.

Table 9

| | Composition | | | | |
|---|---|---|---|---|---|
| | A (parts by weight) | B (parts by weight) | C (parts by weight) | D (parts by weight) | Warping of card (mm) |
| Example 50 | 100 | — | 11 | — | 1.5 |
| Example 51 | — | — | 11 | 100 | 1.5 |
| Example 52 | 50 | 50 | 11 | — | 1.7 |
| Example 53 | — | 50 | 11 | 50 | 1.7 |
| Example 54 | 25 | 50 | 11 | 25 | 1.7 |
| Comparative example 19 | 100 | — | — | — | 2.0 |
| Comparative example 20 | — | — | — | 100 | 2.0 |
| Comparative example 21 | — | 100 | — | — | 3.0 |

A: Poly(ethylene-co-1,4-cyclohexanedimethylene terephthalate), Easter GN07 produced by Eastman Chemical
B: Aromatic polycarbonate, Yupiron S3000 produced by Mitsubishi Gas Chemical Co., Inc.
C: Talc, Talc LMS-300 produced by Fuji Talc Kogyo K.K.
D: Poly(ethylene-co-1,4-cyclohexanedimethylene terephthalate), Easter DN003 produced by Eastman Chemical Examples 55 to 58, and Comparative Examples 22 and 23

The raw materials stated in Table 10 were dry-blended at a ratio stated in Table 10 using a V blender, and the blend was fed into an extruder set at 260° C. and discharged from a T die, to obtain sheets of 100 μm and 300 μm in thickness.

The sheets of 100 μm and 300 μm were overlapped in the order of 100/300/300/100 μm ("/" expresses lamination), and the laminate was fed into a press molding machine and held at a pressure of 1 MPa for 10 minutes, to be thermally fused, thus obtaining cards of 85 mm×54 mm×0.8 mm.

The cards were embossed using a manual embosser (NE-1600 produced by Nippon Jikensha), and the warping of cards was measured according to JIS X 6301.

In Examples 55 and 56 and Comparative Examples 22 and 23, cards were produced at a sheet molding temperature of 250° C. and at a thermal fusion temperature of 120° C. In Examples 57 and 58, cards were produced at a sheet molding temperature of 260° C. and at a thermal fusion temperature of 200° C.

In Comparative Example 23, though the warping was small, the melt kneadability was low and the sheet discharge stability was poor. So, moldability was remarkably low.

Table 10

| | Composition | | | | | |
|---|---|---|---|---|---|---|
| | A (parts by weight) | B (parts by weight) | C (parts by weight) | D (parts by weight) | Warping of card (mm) | Mold-ability |
| Example 55 | 100 | — | 2 | — | 1.8 | ○ |
| Example 45 | 100 | — | 11 | — | 1.4 | ○ |
| Example 56 | 100 | — | 25 | — | 1.0 | ○ |
| Example 57 | 25 | 50 | 2 | 25 | 2.0 | ○ |
| Example 49 | 25 | 50 | 11 | 25 | 1.6 | ○ |
| Example 58 | 25 | 50 | 25 | 25 | 1.2 | ○ |
| Comparative example 22 | 100 | — | 1 | — | 1.9 | ○ |
| Comparative example 23 | 100 | — | 30 | — | 0.9 | X |

A: Poly(ethylene-co-1,4-cyclohexanedimethylene terephthalate), Easter GN07 produced by Eastman Chemical
B: Aromatic polycarbonate, Yupiron S3000 produced by Mitsubishi Gas Chemical Co., Inc.
C: Talc, Talc LMS-300 produced by Fuji Talc Kogyo K.K.
D: Poly(ethylene-co-1,4-cyclohexanedimethylene terephthalate), Easter DN003 produced by Eastman Chemical Examples 59 and 60, and Comparative Examples 24 and 25

The raw materials stated in Table 11 were dry-blended at a ratio stated in Table 11 using a V blender, and the blend was fed into an extruder set at 260° C., and discharged from a T die, to obtain sheets of 100 μm and 300 μm in thickness.

In Example 59, as an inorganic sheet-like filler, kaolin (burned kaolin "Satintone" 5 of 0.8 μm in average grain size produced by Hayashi Kasei K.K.). In Comparative Example 24, as an inorganic spherical filler, silica ("Nipseal" E150K produced by Nippon Silica Kogyo K.K.) was used. In Comparative Example 25, as an inorganic needle-like filler, wollastonite ("NYAD G" produced by Nyco Minerals) was used.

The sheets of 100 μm and 300 μm were overlapped in the order of 100/300/300/100 μm ("/" expresses lamination), and fed into a press molding machine, and held at a temperature of 200° C. and at a pressure of 1 MPa for 10 minutes, to obtain cards in conformity with JIS X 6301.

The cards were embossed by a manual embosser (NE-1600 produced by Nippon Jikensha), and the warping of cards was measured according to JIS X 6301.

TABLE 11

| | A (parts by weight) | B (parts by weight) | C (parts by weight) | | | | D (parts by weight) | Warping of card (mm) |
| | | | Sheet-like filler (talc) | Sheet-like filler (kaolin) | Spherical filler (silica) | Needle-like filler (wollastonite) | | |
|---|---|---|---|---|---|---|---|---|
| Example 45 | 100 | — | 11 | — | — | — | — | 1.4 |
| Example 46 | 100 | — | — | 11 | — | — | — | 1.5 |
| Example 47 | 25 | 50 | 11 | — | — | — | 25 | 1.6 |
| Example 48 | 25 | 50 | — | 11 | — | — | 25 | 1.7 |
| Comparative example 24 | 100 | — | — | — | 11 | — | — | 2.0 |
| Comparative example 25 | 100 | — | — | — | — | 11 | — | 1.9 |

A: Poly(ethylene-co-1,4-cyclohexanedimethylene terephthalate), Easter GN071 produced by Eastman Chemical
B: Aromatic polycarbonate, Yupiron S3000 produced by Mitsubishi Gas Chemical Co., Inc.
C: Inorganic sheet-like filler, Talc LMS-300 produced by Fuji Talc Kogyo K.K.
C: Sheet-like filler (kaolin), burned kaolin Satintone 5 produced by Hayashi Kasei
C: Spherical filler (silica), Nipseal E150K produced by Nippon Silica Kogyo K.K.
C: Needle-like filler (wollastonite), NYAD G produced by Nyco Minerals
D: Poly(ethylene-co-1,4-cyclohexanedimethylene terephthalate), Easter DN003 produced by Eastman Chemical Examples 61 to 64, and Comparative Example 26

The raw materials stated in Table 12 were blended at a ratio stated in Table 12 using a V blender, and the blend was fed into an extruder set at 260° C. and discharged from a T die, to obtain sheets of 100 μm and 300 μm in thickness.

In Examples 61 and 63, as an inorganic sheet-like filler, talc of 5.5 μm in average grain size (PKP-80 produced by Fuji Talc Kogyo K.K.) was used. In Examples 62 and 64, as an inorganic sheet-like filler, talc of 12.0 μm in average grain size (NK48 produced by Fuji Talc Kogyo K.K.) was used. In Comparative Example 26, as an inorganic sheet-like filler, talc of 24.5 μm in average grain size (Supercut 15 produced by Fuji Talc Kogyo K.K.) was used.

The sheets of 100 μm and 300 μm were overlapped in the order of 100/300/300/100 μm ("/" expresses lamination), and the laminate was fed into a press molding machine and held at a temperature of 200° C. and at a pressure of 1 MPa for 10 minutes, to be thermally fused, thus obtaining cards in conformity with JIS X 6301.

The cards were embossed using a manual embosser (NE-1600 produced by Nippon Jikensha), and the warping of cards was measured according to JIS X 6301.

TABLE 12

| | A (parts by weight) | B (parts by weight) | C (parts by weight) | | | | D (parts by weight) | Warping of card (mm) |
| | | | Average grain size 1.4 μm | Average grain size 5.5 μm | Average grain size 12 μm | Average grain size 24.5 μm | | |
|---|---|---|---|---|---|---|---|---|
| Example 45 | 100 | — | 11 | — | — | — | — | 1.4 |
| Example 61 | 100 | — | — | 11 | — | — | — | 1.1 |
| Example 62 | 100 | — | — | — | 11 | — | — | 1.4 |
| Example 49 | 25 | 50 | 11 | — | — | — | 25 | 1.6 |
| Example 63 | 25 | 50 | — | 11 | — | — | 25 | 1.3 |
| Example 64 | 25 | 50 | — | — | 11 | — | 25 | 1.6 |
| Comparative example 26 | 100 | — | — | — | — | 11 | — | 1.9 |

A: Poly(ethylene-co-1,4-cyclohexanedimethylene terephthalate), Easter GN071 produced by Eastman Chemical
B: Aromatic polycarbonate, Yupiron S3000 produced by Mitsubishi Gas Chemical Co., Inc.
C: Talc LMS-300 produced by Fuji Talc Kogyo K.K.
C: Talc PKP-80 produced by Fuji Talc Kogyo K.K.
C: Talc NK48 produced by Fuji Talc Kogyo K.K.
C: Talc SC15 produced by Fuji Talc Kogyo K.K.
D: Poly(ethylene-co-1,4-cyclohexanedimethylene terephthalate), Easter DN003 produced by Eastman Chemical

What is claimed is:

1. An information readable and writable card comprising any one of the following thermoplastic resin compositions I to III:

I. a composition consisting of ingredients (A) and (B);

II. a composition consisting of ingredients (A), (B) and (D); or

III. a composition consisting of 100 parts by weight of one or more selected from ingredients (A), (B) and (D) and 2 to 25 parts by weight of ingredient (C), wherein the composition II or III has a dispersed structure in which a phase substantially comprising ingredients {(A) and (D)} or {(B) and (D)} exists as a continuous phase, ingredient (A) is a polyester composed of dicarboxylic acid components with terephthalic acid component as a main dicarboxylic acid component and ethylene glycol component (I) and 1,4-cyclohexanedimethanol component (II) as main glycol components, wherein the molar ratio (I)/(II) of ethylene glycol component (I) to 1,4-cyclo-hexanedimethanol component (II) is 1 or more;

ingredient (B) is an aromatic polycarbonate;

ingredient (C) is an inorganic sheet-like filler of 0.5 to 20 μm in average grain size; and ingredient (D) is a polyester composed of dicarboxylic acid components with terephthalic acid component as a main dicarboxylic acid component and ethylene glycol component (I) and 1,4-cyclohexanedimethanol component (II) as main glycol components, wherein the molar ratio (I)/(II) of ethylene glycol component (I) to 1,4-cyclohexanedimethanol component (II) is less than 1.

2. The card according to claim 1, which electrically, optically or magnetically records readable and writeable information and/or records information by embossing.

3. The card according to claim 1, wherein the thermoplastic resin is composition III.

4. The card according to claim 1, which is embossed.

5. The card according to claim 1, wherein the sheet-like filler is talc.

6. The card according to claim 1, which is obtained by processing a sheet.

7. The card according to claim 1, which is obtained by processing a multi-layer sheet produced by laminating a plurality of sheets.

8. A method for producing the card according to claim 1 comprising injection molding the thermoplastic resin composition.

9. A thermoplastic resin composition, comprising ingredients (A), (D) and (B):

ingredient (A): a polyester composed of dicarboxylic acid components with terephthalic acid component as a main dicarboxylic acid component and ethylene glycol component (I) and 1,4-cyclohexanedimethanol component (II) as main glycol components, wherein the molar ratio (I)/(II) of ethylene glycol component (I) to 1,4-cyclohexanedimethanol component (II) is 1 or more;

ingredient (B): an aromatic polycarbonate; and ingredient (D): a polyester composed of dicarboxylic acid components with terephthalic acid component as a main dicarboxylic acid component and ethylene glycol component (I) and 1,4-cyclohexanedimethanol component (II) as main glycol components, wherein the molar ratio (I)/(II) of ethylene glycol component (I) to 1,4-cyclohexanedimethanol component (II) is less 1.

10. The thermoplastic resin composition, according to claim 9, which has a dispersed structure in which a phase mainly consisting of the ingredients (A) and (D) exists as a continuous phase.

11. The thermoplastic resin composition, according to claim 9, which has a dispersed structure in which a phase mainly consisting of the ingredients (D) and (B) exists as a continuous phase.

12. A thermoplastic resin composition, comprising 100 parts by weight of one or more thermoplastic resin compositions selected from ingredients (A), (B) and (D) and 2 to 25 parts by weight of ingredient (C):

ingredient (A): a polyester composed of dicarboxylic acid components with terephthalic acid component as a main dicarboxylic acid component and ethylene glycol component (I) and 1,4-cyclohexanedimethanol component (II) as main glycol components, wherein the molar ratio (I)/(II) of ethylene glycol component (I) to 1,4-cyclohexanedimethanol component (II) is kept at 1 or more;

ingredient (B): an aromatic polycarbonate;

ingredient (C): an inorganic sheet-like filler of 0.5 to 20 μm in average grain size;

ingredient (D): a polyester composed of dicarboxylic acid components with terephthalic acid component as a main dicarboxylic acid component and ethylene glycol component (I) and 1,4-cyclohexanedimethanol component (II) as main glycol components, wherein the molar ratio (I)/(II) of ethylene glycol component (I) to 1,4-cyclohexanedimethanol component (II) is less than 1.

13. The thermoplastic resin composition, according to claim 12, which consists of 100 parts by weight, in total, of ingredients (A) and (B) and 2 to 25 parts of ingredient (C).

14. The thermoplastic resin composition, according to claim 12, which consists of 100 parts by weight, in total, of ingredients (A), (D) and (B) and 2 to 25 parts by weight of ingredient (C).

15. The thermoplastic resin composition, according to claim 14, which has a dispersed structure in which a phase mainly consisting of ingredients (A) and (D) exists as a continuous phase.

16. The thermoplastic resin composition, according to claim 14, which has a dispersed structure in which a phase mainly consisting of ingredients (D) and (B) exists as a continuous phase.

* * * * *

UNITED STATES PATENT AND TRADEMARK OFFICE
CERTIFICATE OF CORRECTION

PATENT NO.     : 6,333,113 B2
DATED          : December 25, 2001
INVENTOR(S)    : Sugie et al.

It is certified that error appears in the above-identified patent and that said Letters Patent is hereby corrected as shown below:

<u>Column 26,</u>
Line 5, please insert -- than -- after "less".

Signed and Sealed this

Fourth Day of June, 2002

Attest:

JAMES E. ROGAN
Attesting Officer                    Director of the United States Patent and Trademark Office